(12) United States Patent
Baranwal et al.

(10) Patent No.: US 12,073,343 B2
(45) Date of Patent: Aug. 27, 2024

(54) MACHINE LEARNING MODELS WITH ACCURATE DATA LABELING

(71) Applicant: AT&T Intellectual Property I, L.P., Atlanta, GA (US)

(72) Inventors: Prateek Baranwal, Dallas, TX (US); Jami Daly, Brookhaven, GA (US); Martin Patrick McEnroe, Plano, TX (US); Kelly Dowd, Dallas, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 546 days.

(21) Appl. No.: 17/324,016

(22) Filed: May 18, 2021

(65) Prior Publication Data

US 2022/0374930 A1     Nov. 24, 2022

(51) Int. Cl.
| | |
|---|---|
| *G06Q 10/0631* | (2023.01) |
| *G06N 20/00* | (2019.01) |
| *G06Q 10/0639* | (2023.01) |
| *G06Q 30/0207* | (2023.01) |

(52) U.S. Cl.
CPC ..... *G06Q 10/063112* (2013.01); *G06N 20/00* (2019.01); *G06Q 10/06393* (2013.01); *G06Q 10/06398* (2013.01); *G06Q 30/0215* (2013.01)

(58) Field of Classification Search
CPC ..... G06Q 10/063112; G06Q 10/06393; G06Q 10/06398; G06Q 30/0215; G06N 20/00
See application file for complete search history.

(56) References Cited

U.S. PATENT DOCUMENTS

| | | | |
|---|---|---|---|
| 11,513,520 B2* | 11/2022 | Das | G05D 1/0055 |
| 2018/0181885 A1* | 6/2018 | Higo | G06N 20/20 |
| 2020/0133983 A1* | 4/2020 | Bleda | G06N 20/00 |
| 2020/0160968 A1* | 5/2020 | Lyman | G06V 10/25 |
| 2020/0372338 A1 | 11/2020 | Woods et al. | |
| 2021/0303793 A1 | 9/2021 | Wang et al. | |
| 2022/0019729 A1* | 1/2022 | Sharma | G06F 40/169 |

* cited by examiner

*Primary Examiner* — Bhavesh M Mehta
*Assistant Examiner* — Edward Tracy, Jr.

(57) ABSTRACT

An example method, executed by a processing system, includes receiving data from a data source, routing the data to a plurality of different data labelers to label the data, determining that an inflection point associated with an accuracy of the plurality of different data labelers is reached, re-routing additional data from the data source to a machine learning model, and activating the machine learning model to label the additional data.

20 Claims, 4 Drawing Sheets

MACHINE LEARNING MODELS WITH ACCURATE DATA LABELING

The present disclosure relates generally to communication systems and, more particularly but not exclusively, to methods, computer-readable media, and apparatuses for training machine learning models with accurate data labeling.

BACKGROUND

Machine learning models and artificial intelligence systems may provide excellent predictions based on various types of data sets. However, the accuracy of the predictions and/or decisions generated by the machine learning models may be as good as the accuracy of the data set that was used to train the machine learning models. The data set may include labeled data that is fed to the machine learning models to train the model for a particular application.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media, and apparatuses for training machine learning models with accurate data labeling. In one example, a method performed by a processing system includes receiving data from a data source, routing the data to a plurality of different data labelers to label the data, determining that an inflection point associated with an accuracy of the plurality of different data labelers is reached, re-routing additional data from the data source to a machine learning model, and activating the machine learning model to label the additional data.

In another example, a non-transitory computer-readable medium may store instructions which, when executed by a processing system in a communications network, cause the processing system to perform operations. The operations may include receiving data from a data source, routing the data to a plurality of different data labelers to label the data, determining that an inflection point associated with an accuracy of the plurality of different data labelers is reached, re-routing additional data from the data source to a machine learning model, and activating the machine learning model to label the additional data.

In another example, a device may include a processing system including at least one processor and non-transitory computer-readable medium storing instructions which, when executed by the processing system when deployed in a communications network, cause the processing system to perform operations. The operations may include receiving data from a data source, routing the data to a plurality of different data labelers to label the data, determining that an inflection point associated with an accuracy of the plurality of different data labelers is reached, re-routing additional data from the data source to a machine learning model, and activating the machine learning model to label the additional data.

Embodiments of the present disclosure may train machine learning models with accurately labeled data. A system for labeling of data of the present disclosure may include support for labeling of data of data sources by data labelers, support for automation of data labeling based on dynamic switching of data labeling responsibility between data labelers and data labeling programs, and so forth. In one embodiment, the support may include crowdsource labeling and provide metrics to incentivize accurate labeling by labelers. When an accuracy level is reached, the trained machine learning models may perform the data labeling.

In one embodiment, the support may include gamification of data labeling to efficiently produce unbiased, high-quality labeled data sets which generally tend to be difficult to obtain, inefficiently produced, and difficult to audit. It is noted that such high-quality data sets, which may be produced based on labeling of data as presented herein, may be used to support various solutions which may support decision making based on patterns in labeled data sets, including solutions such as machine learning (ML) solutions, artificial intelligence (AI) solutions, and so forth. The labeling of data as presented herein supports generation of unbiased, high-quality labeled data sets while supporting improvement or optimization of workforce time in generation of the unbiased, high-quality labeled data sets and accurate measurement of the work performed in generation of the unbiased, high-quality labeled data sets.

The labeling of data as presented in various examples described herein may overcome various potential problems associated with use of pure crowdsourcing for data labeling, such as inefficiency in data labeling due to the lack of domain knowledge since many data sets need some domain knowledge in order for labeling to be performed accurately and poor quality of the labeled data sets as data labelers generally are incentivized to produce as many labels as possible irrespective of the accuracy of the labels (thereby resulting in "bad" data labelers that might simply click the first option given for each label in order to increase their label count).

The labeling of data as presented in various examples described herein may overcome various potential problems associated with use of commercial solutions for data labeling, such as security risks due to outside personnel having access to the data being labeled and potentially labeling the data in a manner that may provide problems downstream (e.g., depending on downstream applications which may ultimately make use of the resulting labeled data).

The labeling of data as presented in various examples described herein may overcome various potential problems associated with use of commercial solutions for data labeling, such as inefficiency in data labeling, error-prone data labeling, and potentially-biased labels when agreements are made between the data gathering team and the data labelers which can be technicians, a single labeler, or a label team.

It is noted that these and other aspects of the present disclosure are described in greater detail below in connection with the discussion of FIGS. 1-4.

Figure 1:
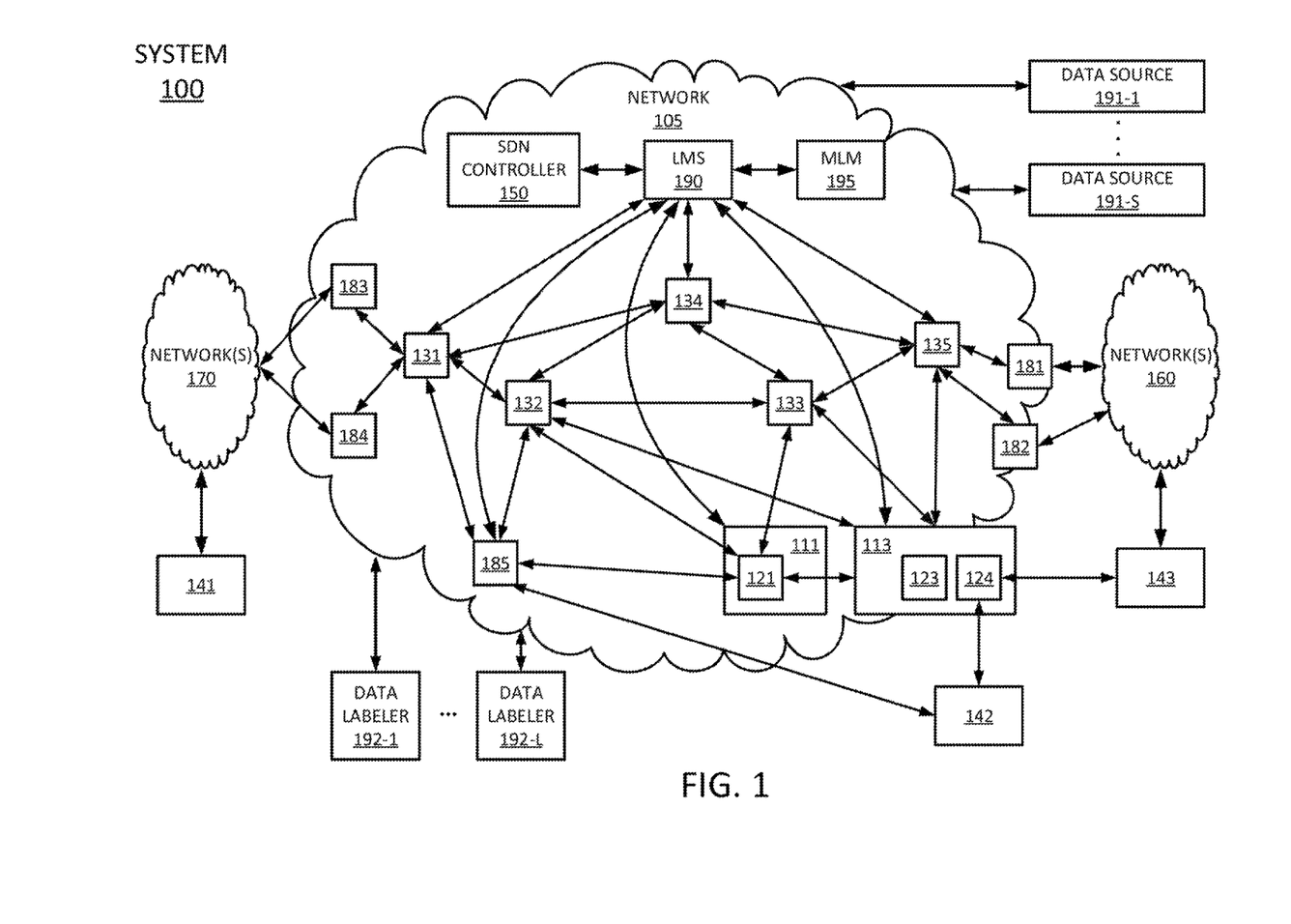
FIG. 1 illustrates an example system including a labeling management system configured to support labeling of data of data sources by data labelers, according to the present disclosure.

To better understand the present disclosure, FIG. 1 illustrates a block diagram depicting one example of a communication network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network.

In one example, the network 105 may include a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additionally include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) including virtual network functions (VNFs). In other words, at least a portion of the network 105 may incorporate software-defined network (SDN) components. In this regard, it should be noted that, as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may include separate domains, e.g., separate routing domains from the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. For instance, the traffic may relate to management actions performed on the network 105 (e.g., management actions such as create/update/delete (CRUD) operations, queries, and so forth). User devices 141-143 may include, for example, cellular telephones, smart phones, personal computers, other wireless and wired computing devices, private branch exchanges, customer edge (CE) routers, media terminal adapters, cable boxes, home gateways and/or routers, and so forth.

In one example, user devices 141-143 may communicate with or may communicate via network 105 in various ways. For example, user device 141 may include a cellular telephone which may connect to network 105 via network 170, e.g., a cellular access network. For instance, such an example network 170 may include one or more cell sites, e.g., including a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may include a serving gateway (SGW), a mobility management entity (MME), or the like. In one example, user device 142 may include a customer edge (CE) router which may provide access to network 105 for additional user devices (not shown) which may be connected to the CE router. For instance, in such an example, component 185 may include a provider edge (PE) router.

In one example, various components of network 105 may include virtual network functions (VNFs) which may physically include hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may include shared hardware, e.g., one or more host devices including line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may include host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server (MS), a domain name service (DNS) server, a packet data network (PDN) gateway (PGW), a gateway mobile switching center (GMSC), a short message service center (SMSC), and the like.

In one example, network 105 includes a software defined network (SDN) controller 150. In one example, the SDN controller 150 may include a computing device or processing system (e.g., a server), such as computing system 400 depicted in FIG. 4, and may be configured to provide one or more operations or functions in connection with examples of the present disclosure for supporting management and resolution of alarms of a communication network.

In one example, NFVI 111 and unit 121, and NFVI 113 and units 123 and 124 may be controlled and managed by the SDN controller 150. For instance, in one example, SDN controller 150 is responsible for such functions as provisioning and releasing instantiations of VNFs to perform the functions of routers, switches, and other devices, provisioning routing tables and other operating parameters for the VNFs, and so forth. In one example, SDN controller 150 may maintain communications with VNFs and/or host devices/NFVI via a number of control links which may include secure tunnels for signaling communications over an underling IP infrastructure of network 105. In other words, the control links may include virtual links multiplexed with transmission traffic and other data traversing network 105 and carried over a shared set of physical links. For ease of illustration the control links are omitted from FIG. 1. In one example, the SDN controller 150 also may include a virtual machine operating on NFVI/host device(s), or may include a dedicated device. For instance, SDN controller 150 may be collocated with one or more VNFs, or may be deployed in a different host device or at a different physical location.

In one example, the functions of SDN controller 150 may include the selection of NFVI from among various NFVI available in network 105 (e.g., NFVI 111 or 113) to host various devices (e.g., routers, gateways, switches, and the like) and the instantiation of such devices. For example, with respect to units 123 and 124, SDN controller 150 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 150 may download the configuration code to the NFVI 113. In another example, SDN controller 150 may instruct the NFVI 113 to load the configuration code previously stored on NFVI 113 and/or to retrieve the configuration code from another device in network 105 that may store the configuration code for one or more VNFs. The functions of SDN controller 150 may also include releasing or decommissioning unit 123 and/or unit 124 when no longer required, the transferring of the functions of units 123 and/or 124 to different NFVI, e.g., when NFVI 113 is taken offline, and so on.

In one example, SDN controller 150 may represent a processing system including a plurality of controllers, e.g., a multi-layer SDN controller, one or more federated layer-0/physical layer SDN controllers, and so forth. For instance, a multi-layer SDN controller may be responsible for instantiating, tearing down, configuring, reconfiguring, and/or managing layer-2 and/or layer-3 VNFs (e.g., a network switch, a layer-3 switch and/or a router, and the like), whereas one or more layer-0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, and so forth. In one example, the layer-0 SDN controller(s) may in turn be controlled by the multi-layer SDN controller. For instance, each layer-0 SDN controller may be assigned to nodes/optical components within a portion of the network 105. In addition, these various components may be co-located or distributed among a plurality of different dedicated computing devices or shared computing devices (e.g., NFVI) as described herein.

In one example, the network 105 may also include internal nodes 131-135, which may include various components, such as routers, switches, route reflectors, and the like, cellular core network, IMS network, and/or VoIP network components, and so forth. In one example, these internal nodes 131-135 also may include VNFs hosted by and operating on additional NFVIs. For instance, as illustrated in FIG. 1, internal nodes 131 and 135 may include VNFs residing on additional NFVI (not shown) that are controlled by SDN controller 150 via additional control links. However, at least a portion of the internal nodes 131-135 may include dedicated devices or components, e.g., non-SDN reconfigurable devices.

In one example, the network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may include a serving gateway (SGW), a mobility management entity (MME), or the like. However, in another example, components 183 and 184 also may include PE routers interfacing with network(s) 170, e.g., for non-cellular network-based communications. In one example, components 181-185 also may include VNFs hosted by and operating on additional NFVI. However, in another example, at least a portion of the components 181-185 may include dedicated devices or components.

In one example, the network 105 includes a labeling management system 190 configured to facilitate labeling of data of a set of data sources 191-1-191-S (collectively, data sources 191) by a set of data labelers 192-1-192-L (collectively, data labelers 192). Generally speaking, data labeling is the assigning of a label(s) to a specific piece of data, such as for characterization of the piece of data, identification of the piece of data, and so forth. For example, labeling data may include labeling a network component image as misconfigured or faulty, labeling a portion of a video clip as including a funny or sad scene, and so forth.

The labeling management system (LMS) 190 may facilitate labeling of data of the data sources 191 by the data labelers 192 by supporting access to data of the data sources 191 by the data labelers 192, supporting handling of labeled data produced by the data labelers 192 (e.g., storage of labeled data, use of labeled data facilitating further labeling of additional data of the data sources 191 by the data labelers 192, use of labeled data for various applications (e.g., ML, AI, or the like), and so forth. The labeling management system 190, as discussed further below, may perform various other functions for supporting data labeling of data of the data sources 191 by the data labelers 192.

The LMS 190, as indicated hereinabove, may be configured to facilitate labeling of data of data sources 191 by data labelers 192. The data sources 191 may include any entities which are sources of data to be labeled. The data labelers 192 may include any entities which are capable of labeling data of the data sources 191. The data that is provided by the data sources 191 and labeled by the data labelers 192 may include textual data (e.g., advertisements or portions thereof, stories or portions thereof, online reviews or portions thereof, and so forth), aural data (e.g., audio clips or portions thereof, radio programs or portions thereof, audio advertisements or portions thereof, and so forth), image data (e.g., photos), video data (e.g., a video clip or portion thereof, an advertisement, a television episode or portion thereof, a movie or portion thereof, and so forth), or the like, as well as various combinations thereof. It will be appreciated that various other types of data may be made available by the data sources 191 and labeled by the data labelers 192. The labeling of data of the data sources 191 by the data labelers 192, and associated management of such data labeling by the LMS 190 are discussed further below.

The LMS 190 may be configured to ensure that data to be labeled from the data sources 191 is obtained by the data labelers 192 for labeling. The LMS 190 may be configured to obtain the data to be labeled from the data sources 191 and provide the data to be labeled to the data labelers 192 (e.g., sending the data to be labeled to the data labelers 192 based on prior agreements, providing the data to the labeled to the data labelers 192 in response to requests from the data labelers 192, publishing the data to be labeled such that the data to be labeled may be accessed by the data labelers, and so forth). The LMS 190 may be configured to enable the data sources 191 and the data labelers 192 to interface directly with each other (e.g., registering the data sources 191 and the data labelers 192 and enabling the data sources 191 and data labelers 192 to interface with each other such that data sources 191 may identify data labelers 192 which are willing and able to label their data, such that data labelers 192 may identify data sources 191 looking for data labelers to label their data, and so forth).

The data sources 191, as indicated hereinabove, provide data to be labeled by the data labelers 192. The data sources 191 may include textual data sources providing textual data, audio data sources providing aural data, image data sources providing image data, video data sources providing video data, multimedia data sources providing multimedia data, and so forth. For example, the data sources 191 may include application servers, web servers, audio servers, image servers, on-demand video servers, streaming video servers, advertising servers, or the like, as well as various combinations thereof. The data sources 191 may make the data available for labeling by the data labelers 192 within the context of providing the data to other entities (e.g., end users for consumption of the data by the end users), as a dedicated function of making the data available to the data labelers 192, or the like, as well as various combinations thereof.

The data labelers 192, as indicated hereinabove, label data of the data sources 191. The data labelers 192 may include human data labelers, automated data labelers (e.g., devices or programs configured to perform data labeling functions), or the like, as well as various combinations thereof. The data labelers 192 may perform data labeling functions using various devices, such as end user devices (e.g., computers, tablets, smartphones, and so forth) in the case of human data labelers, autonomous computing devices (e.g., virtual machines (VMs), edge computing devices, autonomous network devices, and so forth) in the case of automated data labelers, or the like, as well as various combinations thereof. It will be appreciated that the data labelers 192 of FIG. 1 also or alternatively may represent the devices used by labelers for labeling the data of the data sources 191. The data labelers 192 may label a data item by analyzing the data item to determine a proper label for the data item and applying the label to the data item such that the label is associated with the data item.

The data labelers 192 may analyze the data item to determine a label for the data item in various ways. The data labelers 192 may analyze the data item manually in the case of human data labelers, using one or more data analysis programs or functions (e.g., programs or functions configured to identify the text of words that are presented or spoken, configured to identify characteristics of audio content (e.g., intonation, tone, volume, and so forth), configured to identify characteristics of video content (e.g., environments in which video is captured, facial expressions of people in the video content, sentiment detection of people in the video content, and so forth), or the like, as well as various combinations thereof.

The data labelers 192 may apply the labels to the data item in various ways. The data labelers 192 may apply the labels to the data item by associating the label with the data item in the data item (e.g., using data tagging techniques for modifying some aspect of the data item to carry the label), associating the label with the data item in a data item label mapping database, or the like, as well as various combinations thereof. The data labelers 192 may apply the labels to the data item in a manner for enabling the LMS 190 to obtain the labels applied to the data item by the data labelers 192, thereby enabling the data labeling system 190 to analyze the labels applied to the data item by the data labelers 192 and, thus, analyze the labeling of the data items by the data labels for supporting improved data labeling for labeling of the data of the data sources 191 by the data labelers 192.

The labeling of the data item may depend on the data type of the data item. For example, a textual data item may be labeled with a label summarizing the content of the textual data item. For example, an aural data item may be labeled with a label summarizing the audio content of the aural data item, a mood of the speaker (e.g., based on the words spoken, the intonation when the words are spoken, the volume when the words are spoken, and so forth), or the like. For example, an image data item may be labeled with a label summarizing the visual content of the image data item, a location at which the image data item was captured, a mood of the image data item or a subject of the image data item, or the like. For example, a video data item may be labeled with a label summarizing the audio content of the video data item, a label summarizing the visual content of the video data item, a label summarizing a mood of a subject of the video data item (e.g., based on the words spoken, how the words are spoken, facial expressions when the words are spoken, and so forth), or the like. It will be appreciated that various other types of labels may be applied to various types of data to be labeled. It will be appreciated that, although primarily presented with respect to embodiments in which a data item is labeled using a single label, in at least some examples a data item may be labeled using multiple data labels, in which case the multiple data labels may be associated with the data item equally, the multiple data labels may be associated with the data item with different weights (e.g., a primary label assigned to the data item has the highest weight, a secondary label assigned to the data item has the next highest weight, and so forth), or the like, as well as various combinations thereof.

In one embodiment, the label management system 190 may be communicatively coupled to a machine learning model (MLM) 195. The labeled data may be fed to the MLM 195 to train the MLM 195 to eventually automatically perform the data labeling for a particular application in lieu of the data labelers 192.

In one embodiment, machine learning algorithms may be executed by the MLM 195 (or machine learning (ML)-based model). In one embodiment, the MLM 195 or ML may comprise one or more machine learning algorithms that have been "trained" or configured in accordance with accurately labeled input data (e.g., training data) to perform a particular service, e.g., to detect speech or other utterances in audio content, to identify words and phrases in speech and to convert to text, to identify intents and entities in natural language, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, such as deep neural networks (DNNs), decision tree algorithms/models, k-nearest neighbor (KNN) clustering algorithms/models, hidden Markov models (HMMs), conditional random fields (CRF) models, generative adversarial networks (GANs), and so forth.

In one embodiment, an inflection point may be reached where data from the data sources 191 are no longer routed to the data labelers 192. Rather, the LMS 190 may route the data sources directly to the MLM 195 for labeling. In one embodiment, the inflection point may be when an accuracy threshold is reached. In one embodiment, the inflection point may be dynamically set or changed based on the tracked consensus values of a label for a particular set of data and accuracy values of the data labelers 192. When a consensus reaches a desired threshold and an accuracy of the data labelers 192 compared to the consensus reaches the accuracy threshold, the inflection point may be reached to divert the data from the data sources 191 to the MLM 195. In one embodiment, when the data from the data sources 191 is diverted to the MLM 195, a notification may be generated and transmitted to the data labelers 192.

For example, a consensus may be established for different data from the different data sources 191. A consensus may be a highest percentage of a label that is applied to data by the data labelers 192. For example, the data may be an image and the data labelers 192 may attempt to label a sentiment for the image. In one embodiment, 72% of the data labelers 192 may label the sentiment as "happy," 20% of the data labelers 192 may label the sentiment as "content," 8% of the data labelers 192 may label the sentiment as "indifferent." Thus, the consensus may be the sentiment of "happy" for the image.

The data sources 191 may continue to provide images that are to be labeled with a sentiment to the data labelers. In one embodiment, an accuracy threshold may be 90% once the consensus is established. Thus, when 90% or more of the data labelers label the image with the sentiment "happy," the accuracy threshold may be reached and the inflection point may be also reached. After the inflection point is reached, the LMS 190 may divert data from the data sources 191 that are images that require a sentiment label to the MLM 195 for automatic labeling.

In one embodiment, the LMS 190 may provide an interface for the data labelers 192 to improve the labeling of the data. In one embodiment, the interface may be an interface that applies gamification to the labeling performed by the data labelers 192. For example, the data labelers 192 may be evaluated and ranked based on a score. The score may be based on accuracy or may include other factors, (e.g., frequency of labeling, a number of labels provided, an accuracy across different data sets from different data sources 191, and the like).

In one embodiment, the LMS 190 may be configured to analyze the labeling performed by the data labelers 192 for the data of the data sources 191 in order to reward (and, thus, incentivize) accurate labeling of the data of the data sources 191 by the data labelers 192 and penalize (and, thus, de-incentivize) inaccurate labeling of the data of the data sources 191 by the data labelers 192.

In one embodiment, the interface may have the data labelers 192 compete against other data labelers 192 on the basis of an accuracy of a label provided by the data labelers 192. For example, each label provided by the data labelers 192 may be compared against a consensus, as defined above. An accurate label may be one that matches the consensus label. A percentage based on how many times the data labeler provides a label that matches the consensus may be tracked for each data labeler 192. The interface may include a scoreboard that ranks the most accurate data labelers 192 in a rank list. The scoreboard may be updated in real-time as data labelers 192 move up and down the scoreboard based on accuracy.

In one embodiment, the data labelers 192 may be incentivized to reach the top of the scoreboard (e.g., being the most accurate labeler). For example, the top N number of data labelers 192 may receive rewards. In one embodiment, the reward may be gift items, monetary rewards, lunch with the CEO, and the like. In one embodiment, the rewards may be a larger volume of data for labeling. In one embodiment, the rewards may be sending higher priority data from the data sources 191 to the top N ranked data labelers 192. In one embodiment, the reward may be a marking on a profile of the data labelers 192 (e.g., a colored star, icon, or other types of demarcation). In one embodiment, the reward may be to apply a greater weight to data labelers 192 that are the most accurate or near the top of the scoreboard.

In one embodiment, the incentive may simply be to avoid being listed towards the bottom of the scoreboard. For example, the bottom M number of data labelers 192 may be penalized. For example, the penalty may be having a lower ranking, receiving a lower volume of data for labeling, receiving lower priority data for labeling, and the like. In one embodiment, the penalty may be to disqualify the bottom M number of data labelers 192 from participating, e.g., for a period of time.

In one embodiment, various components of the network 105 may be controlled in response to accurately labeled data. For example, some of the data sources 191 may include different servers with different types of media. Various data associated with customers of the endpoint devices 141-143 may be labeled by the data labelers 192 and/or the MLM 195 for sentiment. For example, the labeling may identify the type of sentiment associated with media that is performed by the customers of the endpoint device 141-143. Based on the accurately labeled data, the LMS 190 may control various network elements to redirect the endpoints 141-143 to an appropriate data source 191 that includes a server with a type of media having a sentiment associated with the preferred sentiment of the customers associated with the endpoint devices 141-143. To illustrate, data from the endpoint device 141 may detect that the customer enjoys consuming media that has a funny sentiment. Thus, when the endpoint device 141 searches for media, the LMS 190 may indicate that the endpoint device 141 enjoys funny media. The SDN controller 150 may connect, or control various network elements to route, the endpoint device 141 to a particular data source 191 that has a server with funny media. It should be noted that other applications and control of various hardware may be applied using, or in response to, the accurately labeled data or trained MLM 195, described herein.

It will be appreciated that the labeling management system 190 may be configured to perform various other functions for supporting improved accuracy in data labeling, as discussed further herein.

It will be appreciated that, although presented as a single system for purposes of clarity, the various functions described as being performed by the labeling management system 190 may be distributed across multiple systems which may cooperate to provide such functions.

It should be noted that the system 100 has been simplified. In other words, the system 100 may be implemented in a different form than that illustrated in FIG. 1. For example, the system 100 may be expanded to include additional networks (e.g., a content distribution network (CDN), a network operations center (NOC) network, and the like), additional network devices (e.g., border devices, routers, switches, policy servers, security devices, gateways, and the like), and so forth, without altering the scope of the present disclosure. In addition, system 100 may be altered to omit various elements, substitute elements for devices that perform the same or similar functions and/or combine elements that are illustrated as separate devices. For example, SDN controller 150, labeling management system 190, and/or other network devices may include functions that are spread across several devices that operate collectively as a SDN controller, a labeling management system, an edge device, and so forth. Thus, these and other modifications of the system 100 are all contemplated within the scope of the present disclosure.

Figure 2:
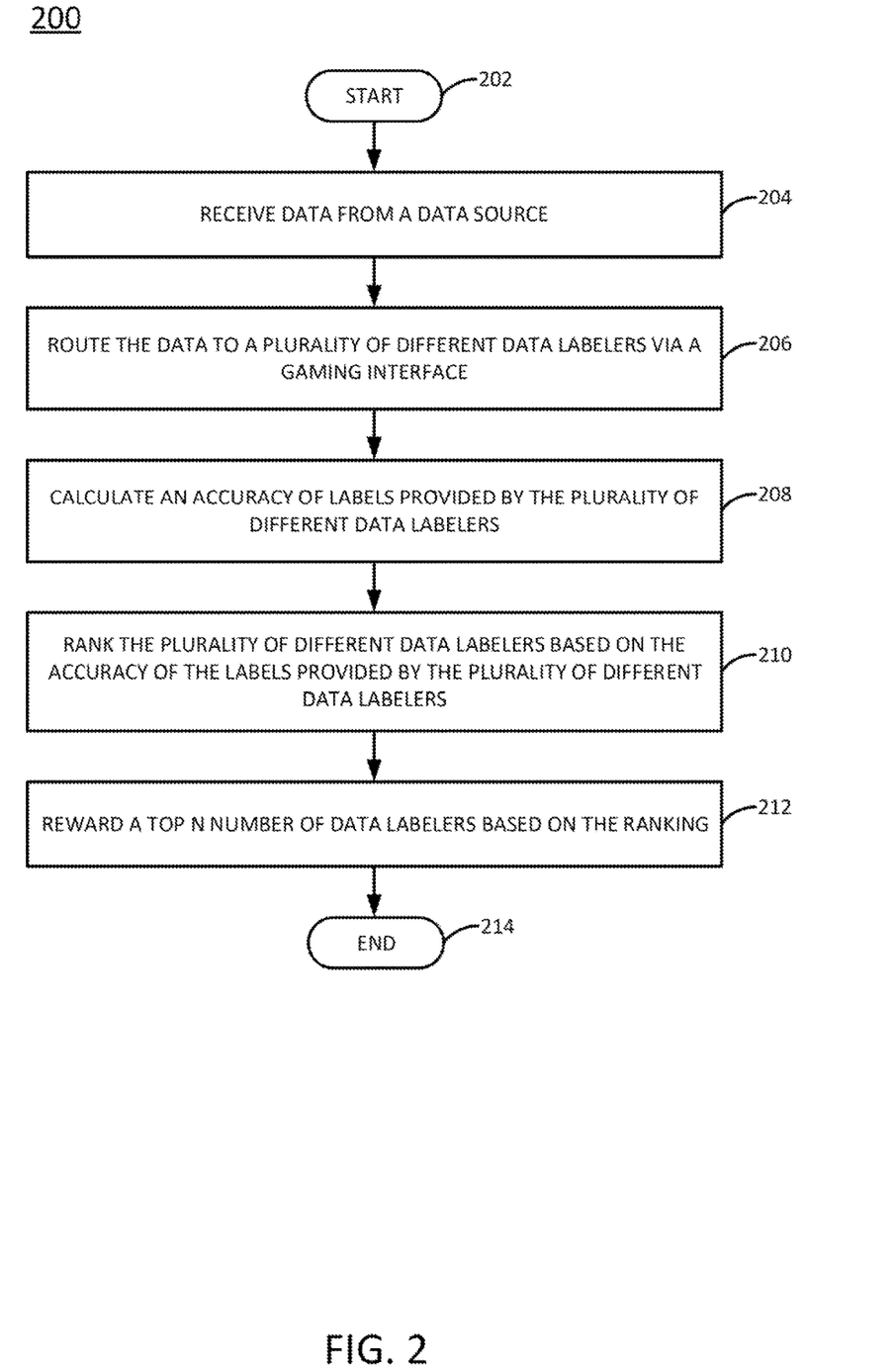
FIG. 2 illustrates a flowchart of an example method for support labeling of data of data sources by data labelers, according to the present disclosure.

FIG. 2 illustrates an example process for support labeling of data of data sources by data labelers of the present disclosure. In one example, the steps, operations, or functions of the method 200 may be performed by any one or more of the components of the system 100 depicted in FIG. 1. For example, in one embodiment, the method 200 may be performed by a management system (e.g., labeling management system 190). In one example, the steps, functions, or operations of method 200 may be performed by a computing device or processing system, such as computing system 400 and/or a hardware processor element 402 as described in connection with FIG. 4 below. For instance, the computing system 400 may represent at least a portion of a labeling management system in accordance with the present disclosure. In one example, the steps, functions, or operations of method 200 may be performed by a processing system comprising a plurality of such computing devices as represented by the computing system 400. For illustrative purposes, the method 200 is described in greater detail below in connection with an example performed by a processing system.

The method 200 begins in step 202 and proceeds to step 204. At step 204, the processing system may receive data from a data source. The data may be any type of data including, textual data, aural data, image data, and the like.

At step 206, the processing system may route the data to a plurality of different data labelers via a gaming interface. The data may be routed to various different data labelers. The data labelers may be human data labelers, automated data labelers, or any combinations thereof. The data labelers may label the data from various different data sources for various different applications. For example, the data may be labeled for sentiment, context, job execution, natural language processing, and the like.

In one embodiment, the data may be labeled in a variety of different ways. The data may be tagged with a label, may be associated via a data item label mapping database, and the like. The label may depend on the type of data that is received. For example, textual data may be labeled with a label that summarizes the content of the textual data. Audio data may be labeled with a label that identifies a mood of the speaker. Image data may be labeled with data that identifies visual content of the image data.

In one embodiment, the gaming interface may provide incentives to the data labelers to accurately label the data. Accurate data labeling may improve analysis performed based on the labels, reduce processing times, and improve accuracy of the outputs generated by applications that use the labeled data.

In one embodiment, the gaming interface may include a scoreboard that ranks the data labelers based on a score. As data labelers move up and down the scoreboard or leaderboard, the data labelers may be rewarded for moving up or penalized for moving down.

At step 208, the processing system may calculate an accuracy of labels provided by the plurality of different data labelers. In one embodiment, the accuracy of the labels may be calculated based on a consensus. A consensus for a particular data item may be a highest percentage of a label that is applied to the data item by the data labelers. The accuracy of the data labeler may be calculated as a percentage of time that the data labeler applies the same data label as the consensus label for the data item.

At step 210, the processing system may rank the plurality of different data labelers based on the accuracy of the labels provided by the plurality of different data labelers. In one embodiment, the accuracy of the labels provided by a data labeler may be used as a score for the leaderboard. In one embodiment, the score may include additional factors or parameters, such as how frequently a data labeler provides labels, how many labels the data labeler has provided, an accuracy across different data sets or data items, and the like. The leaderboard may be continuously updated as the accuracy of the different data labelers is continuously updated.

At step 212, the processing system may reward a top N number of data labelers based on the ranking. As noted above, the data labelers may be incentivized by the gaming interface to provide accurate labels. The top N number of data labelers may be rewarded (e.g., the top 3, the top 5, the top 10, and the like). The reward may be a gift item, a monetary reward, a higher ranking, receiving more data for labeling, receiving higher priority data for labeling, and the like.

In one embodiment, the rewards may be gradually improved for the top N number of data labelers. For example, reaching the top 10 may improve your ranking or weighting. Reaching the top 5 may be rewarded with a gift. Reaching number 1 may be rewarded with a larger gift and/or a monetary reward.

In one embodiment, the bottom M number of data labelers may also be penalized. For example, the bottom M number of data labelers (e.g., the bottom 10, bottom 25%, or the like) may be disqualified from participating for a period of time, receive less data for labeling, and the like. At step 214, the method 200 ends.

Figure 3:
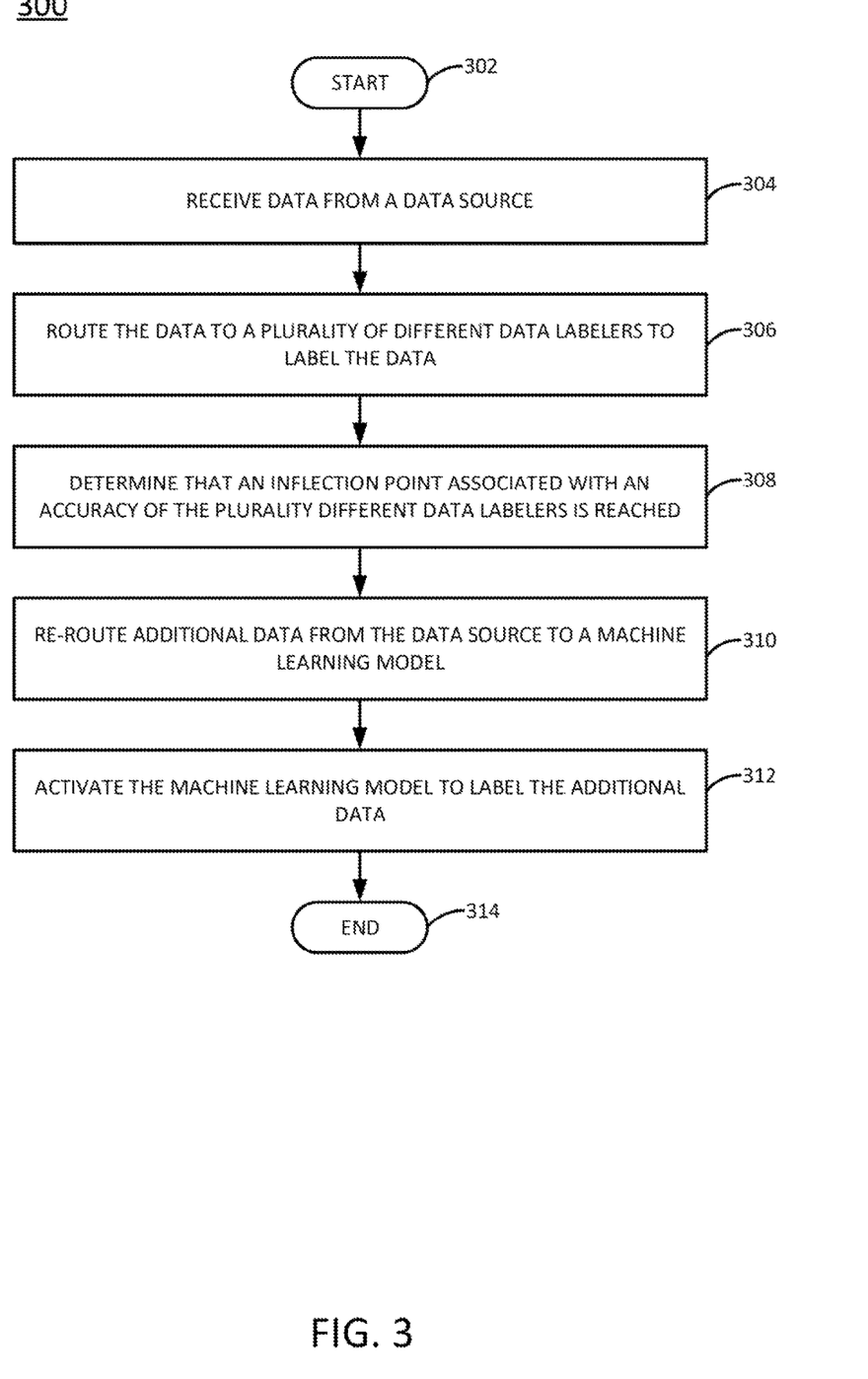
FIG. 3 illustrates a flowchart of an example method for training a machine learning model with data labeled with the support labeling system of the present disclosure.

FIG. 3 illustrates an example process for support labeling of data of data sources by data labelers of the present disclosure. In one example, the steps, operations, or functions of the method 300 may be performed by any one or more of the components of the system 100 depicted in FIG. 1. For example, in one embodiment, the method 300 may be performed by a management system (e.g., labeling management system 190). In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a labeling management system in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system.

The method 300 begins in step 302 and proceeds to step 304. At step 304, the processing system may receive data from a data source. The data may be any type of data including, textual data, aural data, image data, and the like.

At step 306, the processing system may route the data to a plurality of different data labelers to label the data. The data labelers may be human data labelers, automated data labelers, or any combinations thereof. The data labelers may label the data from various different data sources for various different applications. For example, the data may be labeled for sentiment, context, job execution, natural language processing, and the like.

At step 308, the processing system may determine that an inflection point associated with an accuracy of the plurality of different data labelers is reached. For example, the accuracy of each of the plurality of different data labelers may be calculated and tracked, as described above in the method 200. When the overall accuracy of the data labelers relative to the consensus reaches a threshold, the processing system may determine that the inflection point has been reached.

To illustrate, the threshold may be 90% for a data item. The data item may be an image that is to be labeled with a sentiment by the various different data labelers. After an initial period of time, the consensus for the data item may be determined to be a label of "sad." The image may be routed to additional data labelers for labeling. With the passage of a period of time, over 90% of the additional data labelers may eventually label the image also as "sad." Thus, the accuracy threshold is reached and the inflection point is determined to have been reached.

In one embodiment, the threshold for the inflection point may be dynamically changed. For example, the threshold may be changed over time based on changes to the percentages of the consensus label or changes to the accuracy of the data labelers.

In one embodiment, the inflection point may be a time period or a number of labels. For example, the inflection point may be reached after one week of labels have been provided by data labelers or after 10,000 labels have been provided for a data item. The time period and/or number of labels may be combined with the accuracy threshold to determine the inflection point.

At step 310, the processing system may re-routing additional data from the data source to a machine learning model. For example, after the inflection point is reached, additional data of the same type may be routed to the machine learning model. The inflection point may represent a point in time when there are enough accurate labels for the data item for the machine learning model to train on the labels and then accurately provide labels for subsequently received data items having the same data type.

As a result, the data labelers may no longer receive the data for labeling. In one embodiment, when the re-routing is performed, a notification may be transmitted to the endpoint devices of the data labelers (e.g., via the gamification interface).

At step 312, the processing system may activate the machine learning model to label the additional data. For example, the data may be routed to the machine learning model for automated labeling. Additional network controls and/or outputs may be generated based on the labels provided by the machine learning model.

In one embodiment, data to a particular customer may be controlled in accordance with the label. For example, images with a particular sentiment may be filtered away from an endpoint device. To illustrate, an endpoint device may try to access an image. The machine learning model may receive the image to apply a label. The label may be a sentiment that is blocked for access by the endpoint device. As a result, the image may be prevented from being transmitted to the endpoint device based on the label applied by the machine learning model.

In one embodiment, network elements may be controlled to make various connections between endpoint devices and a particular data source or server. For example, text associated with a search for media may be received by the machine learning model. The machine learning model may label the text that indicates an endpoint is searching for "funny" videos. In response, the network may configure network elements to connect the endpoint device to a media server that includes funny videos. The endpoint device may then access the funny videos on the media server.

It should be noted that other examples of data controls and/or network element controls may be deployed based on the labels generated by the machine learning model. At step 314, the method 300 ends.

It will be appreciated that, although presented as ending (for purposes of clarity), the methods 200 and 300 may continue to execute for continuing to support data labeling and improvements in data labeling accuracy. It will be appreciated that various steps of methods 200 and 300 may be re-executed to continue to support data labeling and improvements in data labeling accuracy.

In addition, although not specifically indicated, one or more steps, functions, or operations of the methods 200 and 300 may include a storing, displaying and/or outputting step as required for a particular application. In other words, any data, records, fields, and/or intermediate results discussed in the methods 200 and 300 can be stored, displayed, and/or outputted either on the device executing the respective method or to another device, as required for a particular application.

Furthermore, steps, blocks, functions, or operations in FIGS. 2 and 3 that recite a determining operation or involve a decision do not necessarily require that both branches of the determining operation be practiced. In other words, one of the branches of the determining operation can be deemed as an optional step. Moreover, steps, blocks, functions, or operations of the above-described methods 200 and 300 can be combined, separated, omitted, and/or performed in a different order from that described above, without departing from the examples of the present disclosure.

It will be appreciated that, although primarily described with respect to supporting data labeling within a particular context (namely, data labeling of data for customers of a telecommunications network provider), various example presented herein may be configured or adapted to support data labeling within various other contexts (e.g., for other types of entities with data that needs to be labeled, for entities with data that needs to be labeled that are associated with other types of environments, or the like, as well as various combinations thereof).

Figure 4:
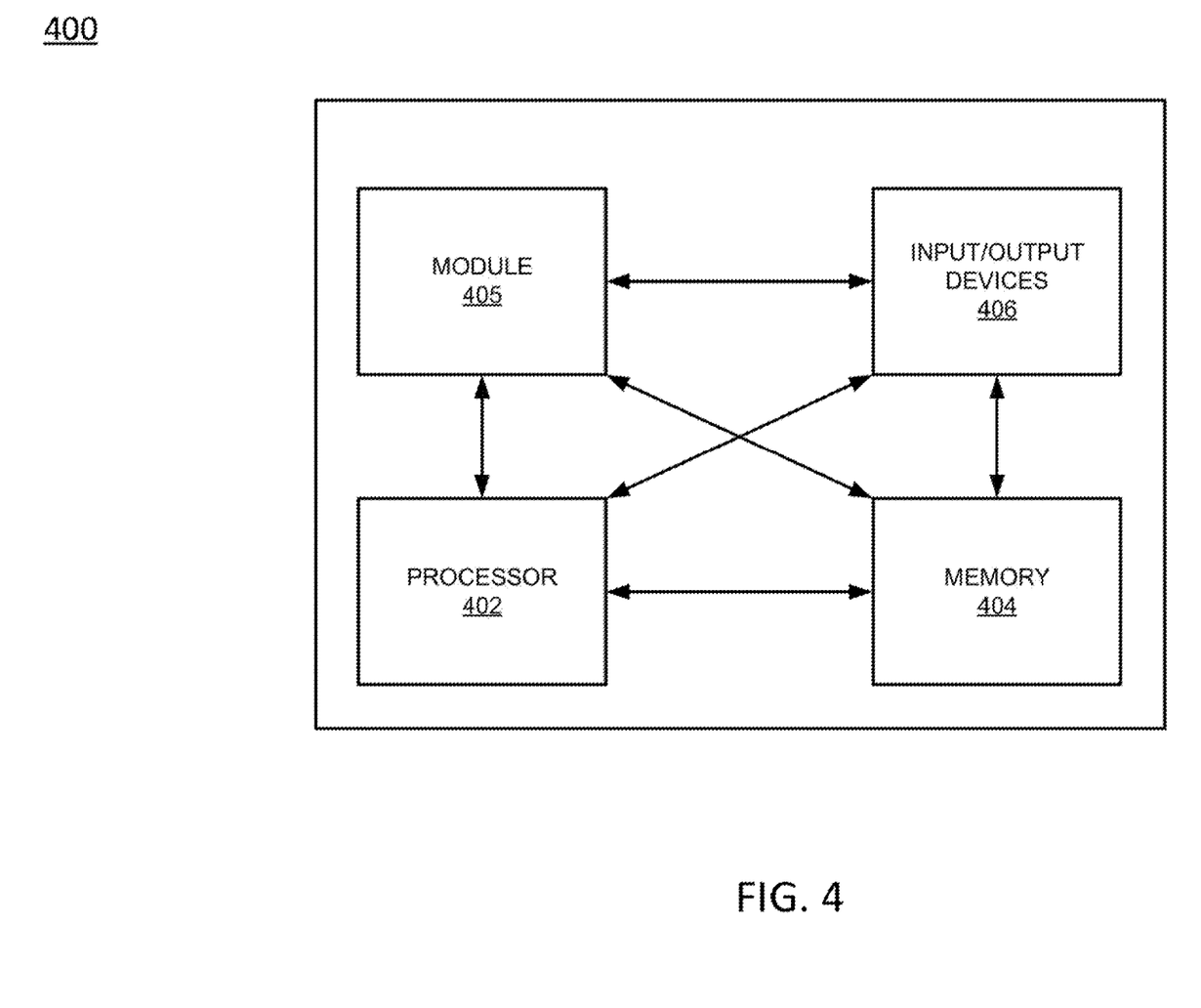
FIG. 4 illustrates a high-level block diagram of a computing device specially configured to perform the functions, methods, operations, and algorithms described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for training machine learning models with accurate data labeling, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300 or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for training machine learning models with accurate data labeling (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for training machine learning models with accurate data labeling (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
receiving, by a processing system comprising at least one processor, data from a data source;
routing, by the processing system, the data to a plurality of different data labelers to label the data;
determining, by the processing system, that an inflection point associated with an accuracy of the plurality of different data labelers is reached, wherein the inflection point comprises when the accuracy of the plurality of different data labelers relative to a consensus reaches an accuracy threshold for the data;
re-routing, by the processing system, additional data from the data source to a machine learning model when the inflection point is reached; and
activating, by the processing system, the machine learning model to label the additional data.

2. The method of claim 1, further comprising:
controlling, by the processing system, requested data to an endpoint device based on the data and the additional data that are labeled.

3. The method of claim 1, further comprising:
controlling, by the processing system, a network element within a communication network to connect an endpoint device to a particular data source based on the data and the additional data that are labeled.

4. The method of claim 3, wherein a label relates to a sentiment.

5. The method of claim 4, wherein the particular data source comprises a media server that includes media associated with the sentiment.

6. The method of claim 1, wherein the routing is performed via a gamification interface.

7. The method of claim 6, wherein the gamification interface comprises a scoreboard that ranks the plurality of different data labelers based on a respective score.

8. The method of claim 7, wherein the respective score is based on a respective accuracy of the plurality of different data labelers.

9. The method of claim 8, wherein the respective accuracy is measured relative to the consensus.

10. The method of claim 9, wherein the consensus comprises a label applied by a highest percentage of the plurality of different data labelers for the data.

11. The method of claim 7, wherein the respective score is based on a frequency of labeling, a number of labels provided, and an accuracy across different data sets from different data sources.

12. The method of claim 7, wherein a top N number of data labelers of the plurality of different data labelers is identified to receive a reward.

13. The method of claim 12, wherein the reward comprises a gift item or a monetary reward.

14. The method of claim 12, wherein the reward comprises an increase in volume of data for labeling.

15. The method of claim 12, wherein the reward comprises receiving higher priority data to be labelled.

16. The method of claim 12, wherein the reward comprises a greater weight for labels applied by the top N number of data labelers.

17. The method of claim 7, wherein a bottom M number of data labelers of the plurality of different data labelers is identified to receive a penalty.

18. The method of claim 17, wherein the penalty comprises at least one of: a lower ranking, receiving a lower volume of data for labeling, or being disqualified from participating as a data labeler.

19. A non-transitory computer-readable medium storing instructions which, when executed by a processing system including at least one processor, cause the processing system to perform operations, the operations comprising:
receiving data from a data source;
routing the data to a plurality of different data labelers to label the data;
determining that an inflection point associated with an accuracy of the plurality of different data labelers is reached, wherein the inflection point comprises when the accuracy of the plurality of different data labelers relative to a consensus reaches an accuracy threshold for the data;
re-routing additional data from the data source to a machine learning model when the inflection point is reached; and
activating the machine learning model to label the additional data.

20. An apparatus comprising:
a processing system including at least one processor; and
a computer-readable medium storing instructions which, when executed by the processing system, cause the processing system to perform operations, the operations comprising:
receiving data from a data source;
routing the data to a plurality of different data labelers to label the data;
determining that an inflection point associated with an accuracy of the plurality of different data labelers is reached, wherein the inflection point comprises when the accuracy of the plurality of different data labelers relative to a consensus reaches an accuracy threshold for the data;
re-routing additional data from the data source to a machine learning model when the inflection point is reached; and
activating the machine learning model to label the additional data.

\* \* \* \* \*